United States Patent
Antonelli et al.

(10) Patent No.: US 8,326,541 B2
(45) Date of Patent: Dec. 4, 2012

(54) METHOD FOR THE ESTIMATION OF FLUIDS MOVED IN COMPARTMENTED AREAS OF THE SUBSOIL

(75) Inventors: Massimo Antonelli, Piacenza (IT); Salvatore Giammetti, Peschiera Borromeo (IT); Italiano Giori, Mediglia (IT); Luca Savini, Milan (IT); Luigi Terzi, Lodi (IT)

(73) Assignee: ENI S.p.A., Rome (IT)

( * ) Notice: Subject to any disclaimer, the term of this patent is extended or adjusted under 35 U.S.C. 154(b) by 442 days.

(21) Appl. No.: 12/595,743

(22) PCT Filed: Mar. 28, 2008

(86) PCT No.: PCT/EP2008/002659
§ 371 (c)(1),
(2), (4) Date: Dec. 4, 2009

(87) PCT Pub. No.: WO2008/125226
PCT Pub. Date: Oct. 23, 2008

(65) Prior Publication Data
US 2010/0083753 A1 Apr. 8, 2010

(30) Foreign Application Priority Data
Apr. 13, 2007 (IT) .............................. MI2007A0746

(51) Int. Cl.
*G01V 7/06* (2006.01)
*G01F 22/00* (2006.01)
*G06F 17/40* (2006.01)
*G06F 19/00* (2006.01)

(52) U.S. Cl. ............... 702/12; 73/1.16; 73/861; 702/55; 702/187; 702/189; 708/200

(58) Field of Classification Search .................. 73/1.01, 73/1.16, 1.73, 73, 432.1, 861, 865.8, 866; 340/500, 540, 603, 636, 606; 702/1, 2, 6, 702/11, 12, 13, 33, 50, 55, 85, 100, 127, 702/187, 189; 708/100, 105, 200
See application file for complete search history.

(56) References Cited

U.S. PATENT DOCUMENTS
3,303,704 A * 2/1967 Brown et al. ............... 73/432.1
(Continued)

FOREIGN PATENT DOCUMENTS
WO    91 00414    1/1991
(Continued)

OTHER PUBLICATIONS

Schultz, Alton K. "Monitoring fluid movement with the borehole gravity meter", Geophysics., vol. 54, No. 10, pp. 1267-1273, (Oct. 1989).

*Primary Examiner* — Edward Cosimano
(74) *Attorney, Agent, or Firm* — Oblon, Spivak, McClelland, Maier & Neustadt, L.L.P.

(57) ABSTRACT

A method for estimating fluid volumes moved in compartmented areas of the subsoil, the method including the steps of a) performing a series of gradiometric measurement campaigns at pre-established time intervals in a survey field, in which the relative variation $\Delta V_i$ of the fluid volumes contained in a corresponding compartmented area of the subsoil is known; b) determining, for each measurement campaign after the first campaign, a parameter $P_{1i}$ based on the entire survey area; and c) determining a variability law that correlates the parameter $P_{1i}$ to the known relative variation $\Delta V_i$ in fluid volumes in the compartmented area of the subsoil.

16 Claims, 1 Drawing Sheet

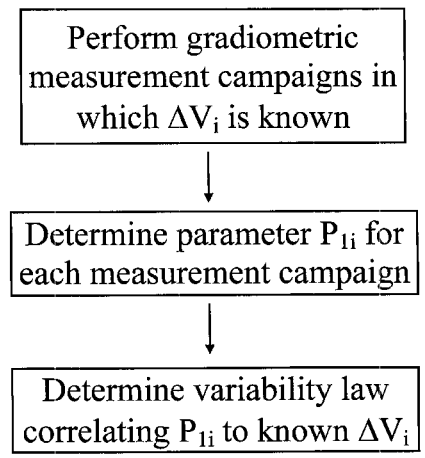

U.S. PATENT DOCUMENTS

| | | | |
|---|---|---|---|
| 5,040,414 A | 8/1991 | Graebner | |
| 5,159,833 A | 11/1992 | Graebner | |
| 6,553,327 B2 * | 4/2003 | Degani | 702/100 |
| 7,110,903 B2 * | 9/2006 | Degani | 702/100 |
| 7,228,246 B2 * | 6/2007 | Degani | 702/100 |
| 7,437,256 B2 * | 10/2008 | Degani | 702/100 |
| 7,881,897 B2 * | 2/2011 | Degani | 702/100 |
| 8,069,002 B2 * | 11/2011 | Degani | 702/100 |
| 2002/0029120 A1 * | 3/2002 | Degani | 702/100 |
| 2003/0135341 A1 * | 7/2003 | Degani | 702/100 |
| 2005/0038619 A1 * | 2/2005 | Degani | 702/100 |
| 2007/0150239 A1 * | 6/2007 | Degani | 702/189 |
| 2009/0076759 A1 * | 3/2009 | Degani | 702/100 |
| 2011/0093231 A1 * | 4/2011 | Degani | 702/100 |
| 2012/0022804 A1 * | 1/2012 | Degani | 702/49 |

FOREIGN PATENT DOCUMENTS

| | | |
|---|---|---|
| WO | 99 58816 | 11/1999 |

* cited by examiner

```
┌─────────────────────────────┐
│  Perform gradiometric       │
│  measurement campaigns in   │
│  which $\Delta V_i$ is known│
└─────────────────────────────┘
              │
              ▼
┌─────────────────────────────┐
│  Determine parameter $P_{1i}$ for │
│  each measurement campaign  │
└─────────────────────────────┘
              │
              ▼
┌─────────────────────────────┐
│  Determine variability law  │
│  correlating $P_{1i}$ to known $\Delta V_i$ │
└─────────────────────────────┘
```

METHOD FOR THE ESTIMATION OF FLUIDS MOVED IN COMPARTMENTED AREAS OF THE SUBSOIL

The present invention relates to method for estimating volumes of fluids moved in compartmented areas of the subsoil, such as, for example, natural deposits, also called reservoirs, it can be applied industrially in oil fields, and additionally, also for monitoring the production and storage of hydrocarbons and reducing mining risks during the explorative phase and development of onshore and off-shore reservoirs.

BACKGROUND OF THE INVENTION

In the exploration of subsoil resources, it is customary to rely on the measurement of the vertical component of the gravity field and the vertical gradient of the same field. From an analysis of these data, it is possible to deduce information on the density distribution of the subsoil which characterizes a particular site.

On the basis of this methodology, it is also possible to obtain the mass variation of the hydrocarbons present inside a reservoir.

The idea at the basis of this technique is that as the movements of hydrocarbons inside a reservoir are correlated to density variations, they can be appreciated by means of vertical gravity gradient measurements.

It is since the thirties', in fact, that measurements of the gravimetric field gradient have been successfully used in the exploration of resources of the subsoil. Since 1936 the importance has been known of the use of the vertical gradient which, as it has a better resolution and is relatively insensitive to regional effects, often has particular structures which cannot be easily obtained from gravimetric field data.

The measurement of the vertical gravimetric field gradient can be effected by means of specific instruments called gradiometers.

Alternatively, the vertical gradient of the gravity field of a point can be measured, with good approximation, by means of the almost contemporaneous acquisition of two gravimetric measurements referring to different heights.

In this second case, before interpreting the data acquired in the field in geological terms, their reduction in terms of Bouguer anomaly is frequent, from which the undesired effects are removed and the calculation and analysis of the vertical gradient is subsequently effected.

The most important corrections to be made are the following:
Instrumental drift
Tidal correction
Latitude correction
Free Air correction
Bouguer correction
Topographic correction The description of these corrections is treated hereunder.
Instrumental drift: the readings of data with a gravimeter undergo time variations due to the elastic characteristics of the materials which form the instrument itself. The instrumental drift can be easily determined by repeating the measurement in the same station in different times, typically every 1-2 hours. The representation referring to Cartesian axes gives the drift curve which, for many gravimeters is of the linear type.

A definite value is subtracted with each measurement effected in subsequent stations, on the basis of the measurement time.

Tidal correction: the drift measured in reality contains the further contribution of an effect of the sea type due to moon-sun attraction (tide). The correction to be made is calculated on a theoretical basis by means of formulae which allow the quantification of this effect, such as, for example, the Longman formula.

Latitude correction: both the Earth's rotation and its equatorial swelling produce an increase in gravity with the latitude, and this must be considered when reducing the gravity data observed.

Free air correction: this is a correction used in order to consider the altitude of the measuring station.

Bouguer correction: this correction is used to consider the attraction due to the interposed masses between the measuring station and the reference surface. In 1749, Bouguer suggested that this additional attraction could have been calculated like that due to the action of an infinite horizontal plate having a thickness equal to the elevation from sea level of the measuring station.

Topographic correction: The approximation of the plate may be unsatisfactory in an area with an articulated topographic trend.

Under these conditions, it is appropriate to add a correction in order to consider the masses above the plate and those whose contribution has been erroneously subtracted in the Bouguer correction.

After the reductions listed, the vertical gradient of the field is calculated as described hereunder.

Variations in density in the subsoil with time can be measured and monitored from the measurements of the vertical gravity field gradient.

This method is already in use for measuring and monitoring water layers and geothermic fields.

SUMMARY OF THE INVENTION

The objective of the present invention is to provide a method for the estimation of fluid volumes, such as, for example, liquid and/or gaseous hydrocarbons moved in compartmented areas of the underground, following, for example, production, injection, and/or storing.

Within the above mentioned objective, it is necessary to draw a calibration curve characteristic for each single field reservoir.

These and other objectives can be achieved, according to the present invention, by means of an estimation method of the volumes of fluids moved in compartmented areas.

Further characteristics of the method are the object of the dependent claims.

The characteristics and advantages of an estimation method of the fluid volumes in compartmented areas, according to the present invention, will appear more evident from the following illustrative and non-imitating description.

BRIEF DESCRIPTION OF THE DRAWING

The FIGURE is a flowchart illustrating the method.

DETAILED DESCRIPTION OF THE INVENTION

The estimation method of fluid volumes in the sub-soil, according to the invention, comprises a first gradiometric measurement phase "to frame/calibrate the area" on the basis of which a model is determined, by statistical approximation, for quantifying the movement of the fluid volumes, such as, for example, hydrocarbons, produced, injected and/or stored in the subsoil, the Figure.

The estimation method of fluid volumes in the sub-soil, according to the invention, comprises a first gradiometric measurement phase "to frame/calibrate the area" on the basis of which a model is determined, by statistical approximation, for quantifying the movement of the fluid volumes, such as, for example, hydrocarbons, produced, injected and/or stored in the subsoil.

More specifically, a series of measurement campaigns are effected, repeated over a certain period of time, with the aim of quantifying the amount of the fluid movements, by means of a model of their production, injection and/or storage.

The degree of accuracy of this model is then evaluated through the statistical analysis of the data obtained.

The measurement operation campaigns are effected on a series of stations suitably dislocated in the survey area.

The measurement is effected, for each single station, using a precision gravimeter and a tripod suitably positioned to allow measurement at a certain distance and constant from the ground.

For the geophysical applications mentioned above, it is advisable to use gravimeters having a precision not lower than µGal (microgal).

From an operative point of view, the campaign measurements consist of the following phases.

A first ground gravimetric measurement is acquired $G_{bot}$ followed by a second gravimetric measurement $G_{top}$ by positioning the gravimeter at a distance dh from the ground using a tripod.

The distance dh from the ground is preferably kept constant in each single station and during the whole survey measurement. The Applicant has in fact observed that, by maintaining the distance from the ground constant, in each single station and for the whole survey, the measurements and definitions of gradiometric anomalies are more accurate.

On the basis of the $G_{bot}$ and $G_{top}$ values measured, the gravity values $G^*_{bot}$, $G^*_{top}$ are then determined, corrected with respect to the effects previously discussed.

The vertical gradient value of the gravimetric field is obtained from the correct gravity values, by means of the following formula:

$$VGG = \frac{(G^*_{bot} - G^*_{top})}{dh} \quad (1)$$

The determination of the difference in level dh between two relative measurements in each single station is effected by means of a laser distantiometer with millimetric precision.

This acquisition and elaboration procedure is then repeated with time on the same area, insisting on the same measurement stations.

A time lapse signal is then obtained, i.e. a signal linked to the gravity variations in the subsoil over a period of time.

The time lapse signal is calculated as the difference between two gradiometric surveys effected in the same measurement station, at different times:

$$TL_{ji} = VGG_i - VGG_j \quad (2)$$

In this way it is possible to evaluate which zones of the area examined have undergone a density variation, thus revealing where there have been relative movements of fluids.

In this way, a qualitative result is obtained, relating to the volume variations of fluids in the subsoil, connected, from case to case, with production, injection and/or storage operations.

The Applicant subsequently identified a calibration curve characteristic of each single storage or production reservoir, which correlates the variations in the gradiometric values detected over a certain time lapse, with the corresponding volumes of the fluids moved, or produced, injected and/or stored, within the same time period.

The Applicant has also developed, tested and validated an assessment method of said calibration curve.

As far as qualitative evaluations of the movements of masses with time are concerned, the Applicant deemed it suitable to find a calibration curve which would relate volumetric variations of fluids with time lapse data and not with the gravity gradient data of a single assessment.

For this purpose, it was necessary to assess a characteristic parameter of the fluid volume variation associated with the production, injection and/or storage operations.

The use of the integral of time lapse values on the whole definition dominium of the area examined, proved to be adequate for this purpose:

$$\iint TL_{1i}(x,y)dxdy \quad (3a)$$

The value so obtained is preferably normalized with respect to the integral of the first time lapse $TL_{12}$, thus assuming the first assessment as reference point.

An adimensional parameter $P_{1i}$ is thus obtained, bound to the quantitative global variation of the volumes, defined as $$P_{1i} \equiv \frac{\iint TL_{1i}(x,y)dxdy}{|\iint TL_{12}(x,y)dxdy|} \quad (4a)$$

The parameter $P_{1i}$ can be calculated on the basis of the values acquired with the measurement campaign number i.

In the same way, it is also suitable to use as parameter $P_{1i}$ the summation of the time lapse values measured in the n measurement stations distributed on the whole survey area:

$$\sum_n TL_{1i}(n) \quad (3b)$$

Also in this case, the value thus obtained is preferably normalized with respect to the summation of the first time lapse measurements $TL_{12}$ in order to obtain an adimensional parameter:

$$P_{1i} \equiv \frac{\sum_n TL_{1i}(n)}{\left|\sum_n TL_{12}(n)\right|} \quad (4b)$$

The Applicant then constructed the calibration curve on the basis of at least three acquisition campaigns, on known volumes of fluids moved (produced, injected and/or stored).

On the basis of the parameters $P_{1i}$ associated with the time lapse whose moved'volumes $\Delta V_i$ are known, the relationship between the parameters $P_{1i}$ and the corresponding known volumes produced, injected and/or stored $\Delta V_i$ was reconstructed by approximation.

Various controls of the results obtained demonstrated and confirmed that the variation law thus determined allows the volume variation of moved fluids (produced, injected and/or stored) to be estimated starting from gradiometric measurement campaigns subsequent to those of the first phase "for framing/calibrating the area".

In a purely illustrative manner, a method is described herein for the determination of a possible law which correlates the gradiometric values measured with the volume of fluids, such as, for example, hydrocarbons, moved i.e. produced, injected and/or stored.

Assuming a linear relationship between the parameter $P_{1i}$ and the volume of hydrocarbons moved $\Delta V_i$, of the type:

$$P = a + b\,\Delta V \qquad (5)$$

a line can be constructed to be used for estimating $\Delta V$ starting from the fourth survey onwards.

The $P_{1i}$ parameters associated with the first three measurement campaigns and a knowledge of the relative volumes moved are necessary for defining the parameters a and b.

For the evaluation of the parameters a and b, with the relative uncertainties $\delta a$ and $\delta b$, it is possible, for example, to use the approximation method of the square minima, which minimizes the differences between the theoretical values of the ideal straight line and the data observed, i.e. the following expression:

$$\chi^2 = \sum_{i=1}^{n} \frac{(P_i - a - b\Delta V_i)^2}{\delta P_i^2} \qquad (6)$$

Once a and b have been determined in this way, it is possible, knowing the value of the parameter $P_{1i}$, to evaluate the corresponding value of $\Delta V$.

The uncertainty and consequently the sensitivity of the method depend on the uncertainty of the parameters a and b and the uncertainty $\delta P$ on the parameter P which comes from the gravity measurements.

The equation for estimating the moved volumes is:

$$\Delta V = \frac{(P - a)}{b} \qquad (7)$$

Therefore, the associated error $\delta\Delta V$ is given by:

$$\delta\Delta V = \left|\frac{\partial \Delta V}{\partial P}\right|\delta P + \left|\frac{\partial \Delta V}{\partial a}\right|\delta a + \left|\frac{\partial \Delta V}{\partial b}\right|\delta b \qquad (8)$$

In the same way it is possible to assume a polynomial variability law of a suitable degree and use, as an approximation method, the square minima method or interpolation.

The characteristics of the method object of the present invention, as also the relative advantages, are evident from the above description.

The Applicant has added an algorithm to the determination of the vertical gravity gradient and relative time lapse processings, for estimating the fluid volumes moved in reservoirs over a period of time.

Finally, it is evident that the method thus conceived can undergo further modifications and variations, all included in the scope of the invention.

What is claimed:

1. A method for estimating a fluid volume moved in a compartmented area of a subsoil, the method comprising:
    a) performing two or more gradiometric measurement campaigns at pre-established time intervals, in a survey field in which a relative variation $\Delta V_i$ in fluid volumes in the compartmented area of the subsoil is known;
    b) determining, for each measurement campaign after the first campaign, a parameter $P_{1i}$ based on the entire survey field; and
    c) determining a variability law that correlates the parameter $P_{1i}$ to the known relative variation $\Delta V_i$ in fluid volumes in the compartmented area of the subsoil.

2. The method of claim 1, comprising a) performing three or more gradiometric measurement campaigns.

3. The method of claim 1, wherein the gradiometric measurement campaigns comprise measuring a vertical gravimetric field gradient using a gradiometer.

4. The method of claim 1, wherein the gradiometric measurement campaigns comprise, for each measurement station, an almost contemporaneous acquisition of two gravimetric measurements, $G_{bot}$ and $G_{top}$, taken at different elevations using a gravimeter and a tripod.

5. The method of claim 4, further comprising correcting the gravimetric measurements $G_{bot}$ and $G_{top}$ with respect to one or more influencing factors, to obtain corrected gravimetric measurements $G^*_{bot}$ and $G^*_{top}$.

6. The method of claim 5, further comprising determining a gradiometric measurement based on the corrected gravimetric measurements $G^*_{bot}$ and $G^*_{top}$ according to formula (1):

$$VGG = \frac{(G^*_{bot} - G^*_{top})}{dh} \qquad (1)$$

wherein dh is a difference in level between two measurements taken at a single measurement station.

7. The method of claim 6, comprising measuring dh using a laser distantiometer.

8. The method of claim 6, wherein dh is identical at each measurement station in the survey field, during each of the two or more gradiometric measurement campaigns.

9. The method of claim 1, wherein b) further comprises determining a time lapse $TL_{ji}$ value as a difference between two gradiometric measurements, $VGG_i$ and $VGG_j$, performed at a measurement station at two different times.

10. The method of claim 9, wherein b) further comprises determining the parameter $P_{1i}$ based on a summation of a plurality of n time lapse $TL_{1i}$ values distributed over the entire survey field.

11. The method of claim 10, wherein the parameter $P_{1i}$ is the summation of the plurality of n time lapse $TL_{1i}$ values normalized with respect to a summation of the first time lapse $TL_{12}$.

12. The method of claim 9, wherein b) further comprises determining the parameter $P_{1i}$ based on an integral of the time lapse $TL_{1i}$ value over the entire survey field.

13. The method of claim 12, wherein the parameter $P_{1i}$ is the integral of the time lapse $TL_{1i}$ value over the entire survey field, normalized with respect to an integral of the first time lapse $TL_{12}$.

14. The method of claim 13, wherein c) comprises determining a polynomial variability law that correlates the parameter $P_{1i}$ to the known relative variation $\Delta V_i$.

15. The method of claim 13, wherein c) comprises determining a linear variability law that correlates the parameter $P_{1i}$ to the known relative variation $\Delta V_i$.

16. The method of claim 15, further comprising determining the linear variability law by approximation through a square minima method or interpolation.

* * * * *